US011112986B2

(12) United States Patent
Kabra et al.

(10) Patent No.: US 11,112,986 B2
(45) Date of Patent: Sep. 7, 2021

(54) SYSTEMS AND METHODS FOR STORING INFORMATION WITHIN HYBRID STORAGE WITH LOCAL AND CLOUD-BASED STORAGE DEVICES

(71) Applicant: Veritas Technologies LLC, Mountain View, CA (US)

(72) Inventors: Reena Nandkishor Kabra, Akota (IN); Bhautik Patel, Gujarat (IN); Shubham Pendharkar, Pune (IN); Sneha Pawar, Pune (IN); Jitendra Patidar, Pune (IN); Anindya Banerjee, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/215,483

(22) Filed: Dec. 10, 2018

(65) Prior Publication Data
US 2020/0183602 A1    Jun. 11, 2020

(51) Int. Cl.
*G06F 16/185*  (2019.01)
*G06F 3/06*  (2006.01)

(52) U.S. Cl.
CPC .......... *G06F 3/0643* (2013.01); *G06F 3/0604* (2013.01); *G06F 3/067* (2013.01); *G06F 3/0644* (2013.01); *G06F 16/185* (2019.01)

(58) Field of Classification Search
CPC ..................................................... G06F 16/185
See application file for complete search history.

(56) References Cited

U.S. PATENT DOCUMENTS

| 9,588,977 B1* | 3/2017 | Wang ....................... G06F 16/13 |
| 2011/0066668 A1* | 3/2011 | Guarraci ................. G06F 16/27 707/831 |
| 2012/0173822 A1* | 7/2012 | Testardi .............. G06F 11/1453 711/135 |
| 2020/0073575 A1* | 3/2020 | Cai ....................... G06F 3/0605 |

* cited by examiner

*Primary Examiner* — Edward J Dudek, Jr.
(74) *Attorney, Agent, or Firm* — FisherBroyles, LLP

(57) ABSTRACT

The disclosed computer-implemented method for storing information within hybrid storage with local and cloud-based storage devices may include (1) dividing, if required, at the computing device, a file into multiple portions, (2) storing a first portion of the multiple portions as at least one first respective separate object on a local volume stored on the local storage device, (3) storing a second portion of the multiple portions as at least one second respective separate object on a cloud-based volume stored on a cloud-based storage device, and (4) naming each stored portion of the file with a respective object name comprising file metadata describing respective characteristics of the respective portion of the file. Various other methods, systems, and computer-readable media are also disclosed.

24 Claims, 4 Drawing Sheets

SYSTEMS AND METHODS FOR STORING INFORMATION WITHIN HYBRID STORAGE WITH LOCAL AND CLOUD-BASED STORAGE DEVICES

BACKGROUND

Users across the globe generate new digital information every day, ever adding to existing volumes of digital information. Much of the old and new information is stored for future use. Some of the stored information may be frequently accessed, while some may be less-frequently used. Having on-premise storage for less-frequently used data may be less cost-efficient, for example because on-premise storage devices consume power for long periods of time while being accessed infrequently.

SUMMARY

As will be described in greater detail below, the instant disclosure describes various systems and methods for storing information within hybrid storage with local and cloud-based storage devices.

In one embodiment, a method for storing information within hybrid storage with local and cloud-based storage devices may include (1) dividing, at the computing device, a file into multiple portions, (2) storing metadata of the file on a local volume stored on the local storage device (3) storing some or all of the portions on a local volume stored on the local storage device, (4) storing some or all of the portions as separate objects on a cloud-based volume stored on a cloud-based storage device, and (4) identifying each portion of the file stored on the cloud storage with a respective object name including file metadata describing respective characteristics of the respective portion of the file.

In some examples, the method may further include creating at least one volume set, where the at least one volume set comprises (1) the local volume stored on the local storage device and (2) the cloud-based volume stored on the cloud-based storage device. In some embodiments, the method may further include creating a multi-volume file system including the volume set.

In some examples, the method may further include tagging the cloud-based volume as a data-only volume.

In some examples, the method may further include representing the cloud-based volume as a proxy volume in a disk group.

In some examples, the method may further include (1) assigning a tier to the cloud-based volume and the local volume and (2) dividing the file in response to a tiered-storage decision selecting the assigned tier.

In some embodiments, the file metadata may include (1) a file path, (2) a file system unique identifier, (3) a file set identifier, (4) an inode number, (5) an inode generation count, (6) logical offset within the file, (7) size of the length of the portion, (8) a unique number, (9) a flag identifying the respective portion of the file is stored on the cloud-based volume or the local volume, and/or (10) at least one flag identifying a cloud storage class.

In an embodiment, the method may further include storing the file metadata on the local storage device. In an example, the method may further include storing the respective object names on the local storage device.

In some examples, the method may further include ensuring, following a system crash, digital information consistency of the file by (1) identifying information movement in progress during the crash and (2) reorganizing information identified as being moved during the crash.

In some examples, the method may further include updating a stored portion of the file by writing the updated portion of the file in a new object having a new respective object name, where the new respective object name includes file metadata describing respective characteristics of the updated stored portion of the file.

In an embodiment, the method may further include reconstructing, when file system metadata relating to digital information stored on the cloud-based storage device is unusable, contents of the file including its name by parsing object names of the at least one second respective separate object stored on the cloud-based storage device.

In one example, a system for storing information within hybrid storage with local and cloud-based storage devices may include several modules stored in memory, including (1) a dividing module, stored in memory, that divides a file into multiple portions, (2) a first storing module, stored in the memory, that stores metadata of the file on a local volume stored on the local storage device, (3) a second storing module, stored in the memory, that stores one or more multiple portions as at least one second respective separate object on a cloud-based volume stored on the cloud-based storage device, and (4) a naming module, stored in the memory, that names each portion of the file stored in the cloud with a respective object name including file metadata describing respective characteristics of the respective portion of the file. The system may also include at least one physical processor that executes the dividing module, the first storing module, the second storing module, and/or the naming module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) divide, at a computing device, a file into multiple portions, (2) store metadata of the file on a local volume stored on a local storage device, (3) store one or more portions of the file as at least one second respective separate object on a cloud-based volume stored on a cloud-based storage device, and (4) name each portion of the file stored on cloud-based volume with a respective object name including file metadata describing respective characteristics of the respective portion of the file.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
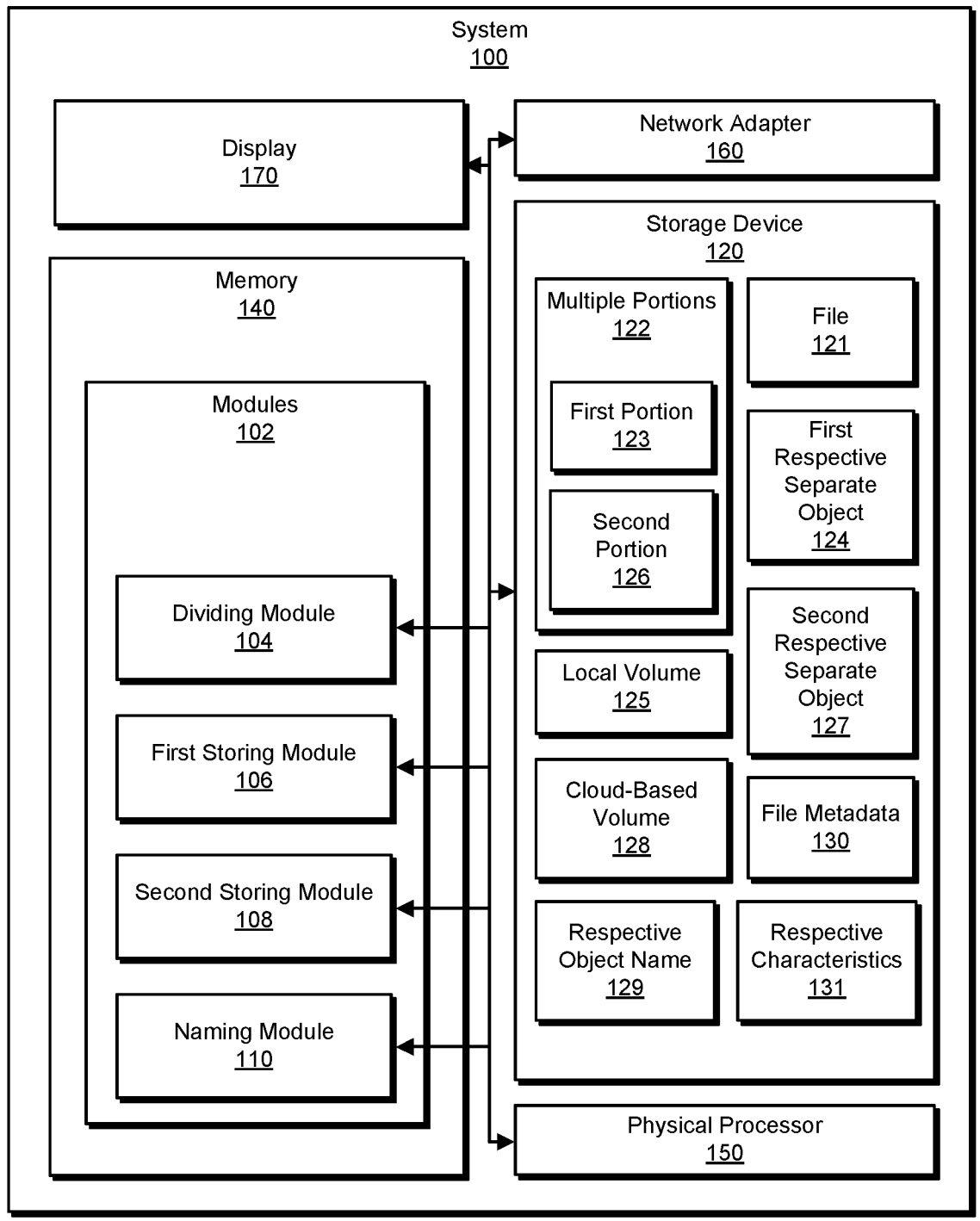
FIG. 1 is a block diagram of an example system for storing information within hybrid storage with local and cloud-based storage devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for storing information within hybrid storage with local and cloud-based storage devices.

To meet market demands for cost-efficient storage of digital information that may be less-frequently used, cloud-based storage services provide platforms for storing and retrieving digital information at competitive affordable prices. Conventional approaches to managing digital information storage at the enterprise level include using file tiering to categorize stored digital information and assign categorized digital information to different storage devices by frequency of use and mission criticality. However, enabling filesystem tiering for cloud storage may have challenges. For example, filesystems must store mapping between cloud-stored objects and files on primary storage. Accessibility of primary storage limits availability of cloud data when storing cloud object details as metadata of respective files in primary storage devices. Further, users may read stale digital information because some cloud service providers provide eventual consistency for digital information writes and deletes. Moreover, ensuring digital information integrity requires digital information consistency while relocating files to and from cloud-based storage devices, even when crashes occur.

The provided systems and methods may enable using cloud-based storage devices as tiers to manage storage needs with agility and flexibility. Users may build hybrid storage environments that seamlessly integrate local storage devices with cloud-based storage devices.

The provided systems and methods may enable migrating digital information from local storage devices between cloud-based storage devices. Thus, some storage capacity provided by expensive direct-attached storage (DAS) devices and storage area network (SAN) devices may be released for mission-critical digital information or high-performance applications, while less-frequently used digital information may be moved to tiers of cloud-based storage devices.

In some examples, the provided systems and methods may represent cloud-based storage devices as proxy volumes in disk groups. Volume sets may be created over sets of volumes including groups of local volumes and cloud volumes. Multi-volume file systems may be created over volume sets. In some examples, file systems may be mounted on the same mount points that were in use by existing data volumes. This may allow applications to seamlessly access digital information even after that digital information is moved to cloud-based storage devices. In some embodiments, cloud-based volumes may have an "fscloud" attribute enabled. These volumes may be tagged as data-only volumes to avoid file metadata from being written onto them. Based on attribute settings, volume managers may decide whether storage must be provisioned locally or in cloud-based storage devices. Thus, filesystem sizes may not be limited by locally-available storage capacity. In some embodiments, each cloud volume may be associated with target storage units called buckets or containers (the terminology varies across cloud vendors). Local volumes and cloud volumes may be assigned to tiers across which files may be migrated. In some examples, "vxcloudd" daemons may manage in/out requests on cloud-based volumes. In some embodiments, migrations may be based on xml policy files that define storage placement policies for digital information. The xml policy files may be customized as needed.

In some examples, in case of file-level migration, single files may be broken into chunks and each chunk may be stored as a single object. Thus, single files may have one or more associated objects. For example, if threshold length is 64 MB, a file of 10 KB will be written in a single chunk as a single object. However, a file of 124 MB will be broken into two chunks of 64 MB and 60 MB, and will be written as two objects. One of the two objects may be written on a local storage device while the other object is written on a cloud-based storage device.

The systems and methods described herein may improve the overall functionality of various computing devices by automatically naming constituent objects of files stored in hybrid storage devices with a format including metadata of the files. In some examples, the provided systems and methods may create object names that include file metadata. This technique may make it easy to access stored files directly from the cloud-based storage devices. Files may be stored in chunks of contiguous blocks (e.g., extent). In some examples, files may be partially stored in cloud-based storage devices and partially in local storage devices (e.g., on-premise storage devices). In some examples, extent flags may be used to identify extents stored on cloud-based storage devices and/or locally-stored extents.

Moreover, in some examples, the systems and methods described herein may improve the overall functionality of computing devices by automatically storing information within hybrid storage systems including both local storage device and cloud-based storage devices, thus enabling (1) cost-effective storage of digital information, (2) releasing expensive DAS devices and SAN devices, and/or (3) addressing other challenges described herein. Examples of computing devices in which the provided techniques may be implemented include, and are not limited to, storage management systems, laptop computers, tablet computers, desktop computers, wearable computing devices (e.g., smart watches, smart glasses), smartphone devices, identity verification devices, access control devices, and/or smart televisions. For example, the provided techniques may advantageously improve the functioning of computing devices by automatically enabling systems to improve digital information protection services and/or software. Also, in some examples, the systems and methods described herein may also advantageously improve the functioning of computing devices by automatically saving power, saving time, better-managing information storage devices, and/or better-managing network bandwidth utilization.

Moreover, in some examples, the systems and methods described herein may improve the overall functionality of computing devices by automatically performing preemptive security actions to thwart malicious attacks on stored digital information. In some examples, security actions may include (1) storing a first portion of multiple portions of a file as at least one first respective separate object on a local volume stored on a local storage device and (2) storing a second portion of the multiple portions of the file as at least one second respective separate object on a cloud-based volume stored on a cloud-based storage device. These actions may preemptively thwart malicious attacks that access objects on either local storage devices or cloud-based volumes by dividing the original files prior to storing less than all of the multiple portions of the files on different storage devices. Thus, when attackers access objects on either local storage devices or cloud-based volumes, the attackers do not have all of the multiple portions needed to reconstitute the original file.

Figure 2:
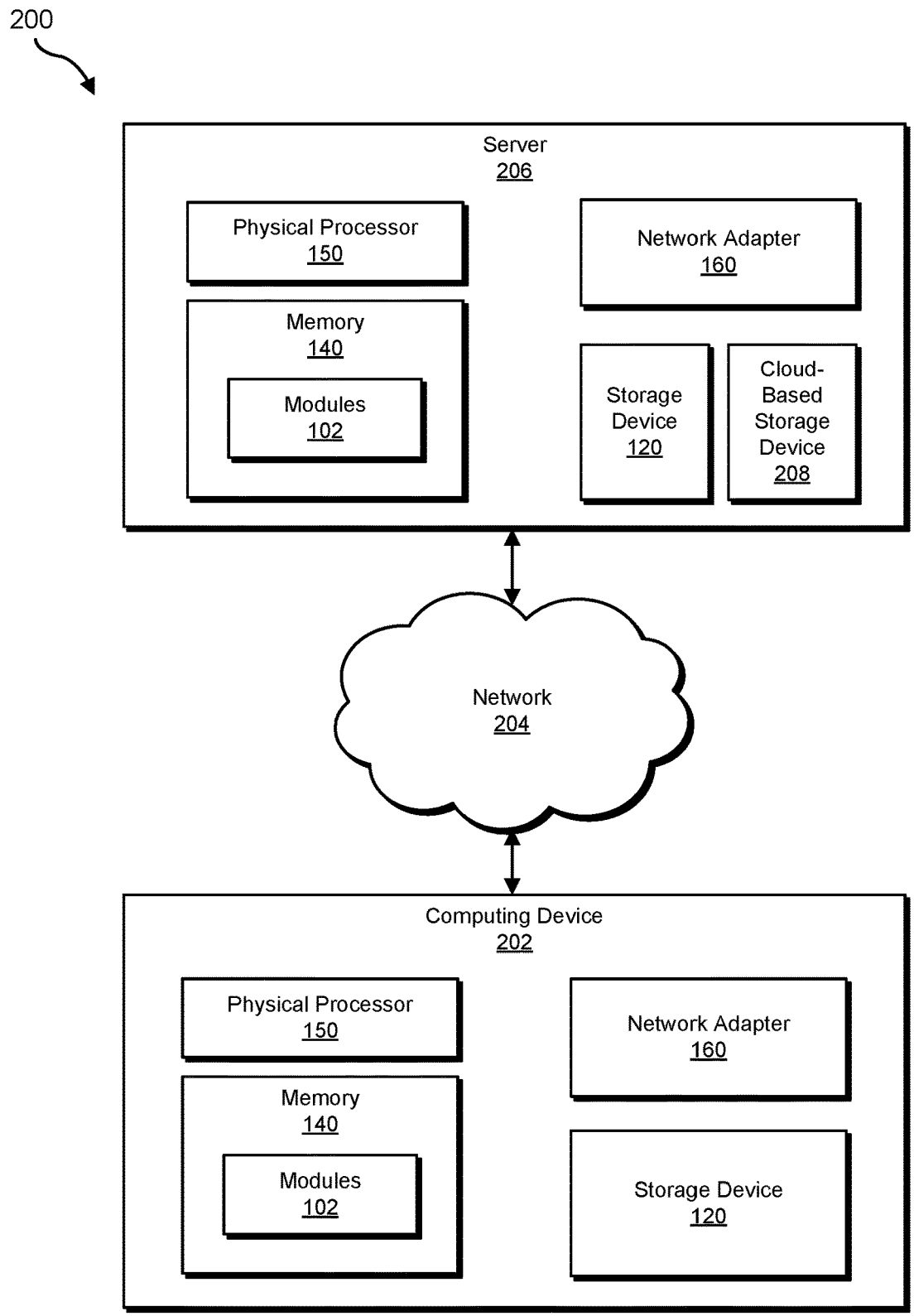
FIG. 2 is a block diagram of an additional example system for storing information within hybrid storage with local and cloud-based storage devices.

The following will provide, with reference to FIGS. 1-2, detailed descriptions of example systems for storing information within hybrid storage with local and cloud-based storage devices. Detailed descriptions of corresponding computer-implemented methods will also be provided in connection with FIGS. 3-4.

FIG. 1 is a block diagram of an example system 100 for storing information within hybrid storage with local and cloud-based storage devices. As illustrated in this figure, example system 100 may include one or more modules 102 for performing one or more tasks. As will be explained in greater detail below, modules 102 may include a dividing module 104, a first storing module 106, a second storing module 108, and a naming module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120 (e.g., a local storage device). Storage device 120 generally represents any type or form of volatile or non-volatile storage device or medium capable of storing data and/or computer-readable instructions. In one example, storage device 120 may store, load, and/or maintain information indicating one or more of a file 121, multiple portions 122, a first portion 123 of the multiple portions 122, a first respective separate object 124, a local volume 125, a second portion 126 of the multiple portions 122, a second respective separate object 127, a cloud-based volume 128, a respective object name 129, file metadata 130, and/or respective characteristics 131. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 102 stored in memory 140. Additionally or alternatively, physical processor 150 may execute one or more of modules 102 to facilitate storing information within hybrid storage with local and cloud-based storage devices. Examples of physical processor 150 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more network adapters, such as network adapter 160. In some examples, network adapter 160 may be a physical network adapter connected to a physical network (e.g., network 204 in FIG. 2). In some embodiments, network adapter 160 may couple system 100 to a remote storage device such as a cloud-based storage device to enable information transfer between system 100 and the remote storage device.

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, display 170 may present at least a portion of a list of folders, at least a portion of a list of files, at least a portion of a list of respective object names 129, and/or at least a portion of a list of respective characteristics 131.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to store information within hybrid storage with local and cloud-based storage devices.

Computing device 202 generally represents any type or form of computing device capable of reading computer-executable instructions. In some examples, computing device 202 may represent a computer running digital information storage software, such as digital information storage management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or digital information transfer. In one example, network 204 may facilitate communication between computing device 202 and server 206. In this example, network 204 may facilitate communication or digital information transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represents any type or form of computing device that is capable of reading computer-executable instructions. In some examples, server 206 may represent a computer running digital information storage software, such as digital information storage management software. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another. In some examples, server 206 may be a cloud-based server including at least one cloud-based storage device 208.

Cloud-based storage device 208 generally represents any type or form of tangible storage devices. Cloud-based storage device 208 may generally represent any type or form of volatile or non-volatile storage device or medium capable of storing data and/or computer-readable instructions. In one example, cloud-based storage device 208 may store, load, and/or maintain information indicating one or more of second portion 126 of the multiple portions 122, second respective separate object 127, cloud-based volume 128, respective object name 129, file metadata 130, and/or respective characteristics 131. In some examples, cloud-based storage device 208 may generally represent multiple storage devices. Examples of cloud-based storage device 208 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
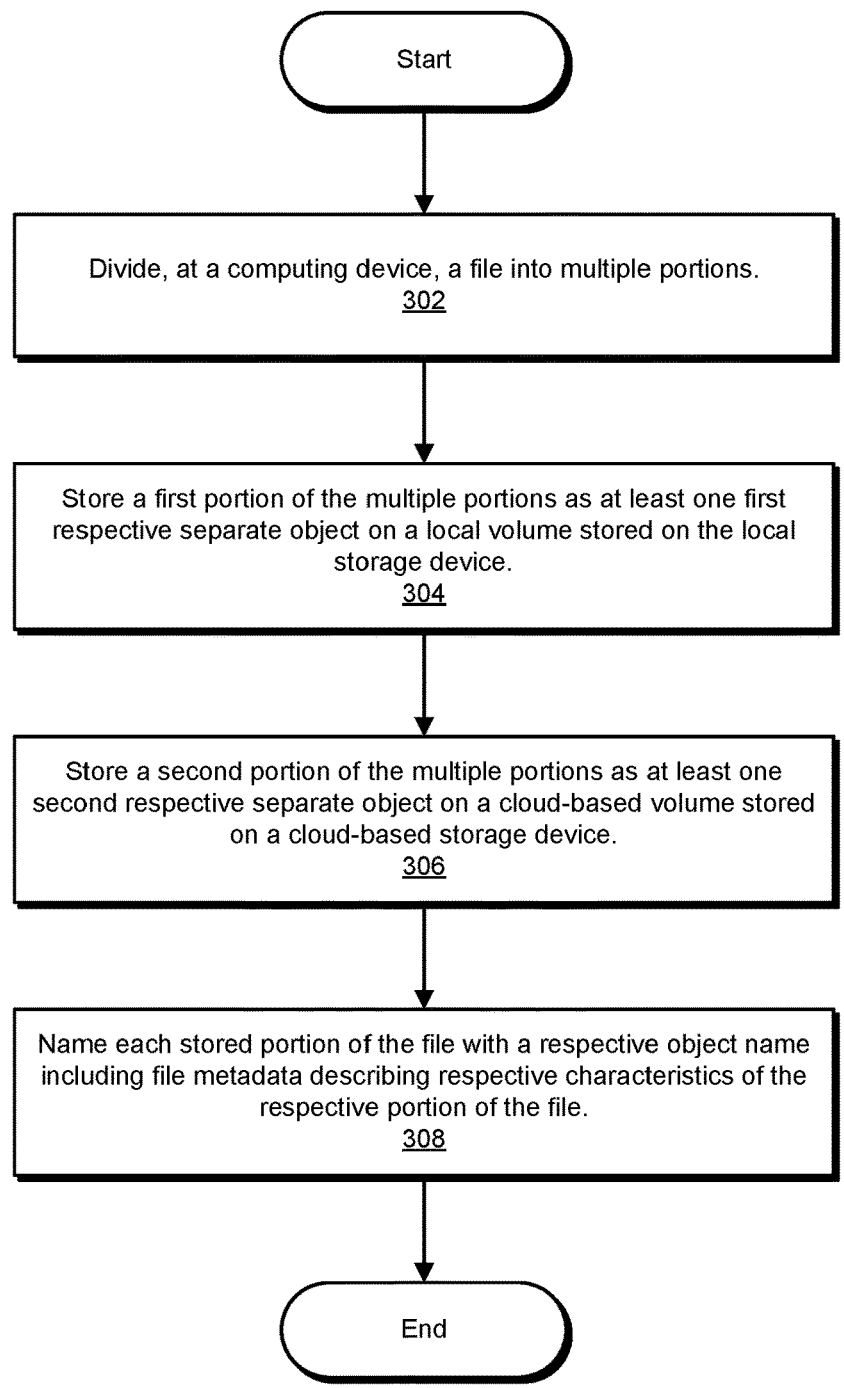
FIG. 3 is a flow diagram of an example method for storing information within hybrid storage with local and cloud-based storage devices.

FIG. 3 is a flow diagram of an example computer-implemented method 300 for storing information within hybrid storage with local and cloud-based storage devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may divide files into multiple portions. The systems described herein may perform step 302 in a variety of ways. For example, dividing module 104 may, as part of computing device 202 and/or server 206 in FIG. 2, divide file 121 into multiple portions 122.

As illustrated in FIG. 3, at step 304 one or more of the systems described herein may store one portion of the multiple portions as first respective separate objects on local volumes stored on local storage devices. The systems described herein may perform step 304 in a variety of ways. For example, first storing module 106 may, as part of computing device 202 and/or server 206 in FIG. 2, store first portion 123 of multiple portions 122 as at least one first respective separate object 124 on local volume stored 125 on storage device 120.

In some examples, metadata of a file may always be stored on local storage. In some embodiments, data in files may be maintained as a single portion or may be divided into multiple portions, depending on a size of the file, how the file may be accessed, and the like. In an example, when data of a file is divided into multiple portions, those multiple portions can be, but need not be, of equal sizes. In another embodiment, any of the portions (either single or few or all of multiple portions) may be stored either in local storage or in cloud storage. Thus, files having multiple portions may have some portions stored in local storage and a remainder of the portions stored in cloud storage. In an example, files having multiple portions may have all portions stored in cloud storage.

In some examples, method 300 may further include creating at least one volume set, where the at least one volume set comprises (1) the local volume stored on the local storage device and (2) the cloud-based volume stored on the cloud-based storage device. In some embodiments, method 300 may further include creating a multi-volume file system including the volume set.

As illustrated in FIG. 3, at step 306 one or more of the systems described herein may store second portions of the multiple portions as second respective separate objects on cloud-based volumes stored on cloud-based storage devices. The systems described herein may perform step 306 in a variety of ways. For example, second storing module 108 may, as part of computing device 202 and/or server 206 in FIG. 2, store second portion 126 of the multiple portions 122 as at least one second respective separate object 127 on cloud-based volume 128 stored on cloud-based storage device 208.

In some examples, file systems may store portions of the file on different respective cloud-based storage devices provided by different providers of cloud-based storage services. For example, providers of cloud-based storage services may include AMAZON WEB SERVICES, AZURE, and GOOGLE CLOUD.

In some examples, method 300 may further include (1) assigning a tier to the cloud-based volume and the local volume and (2) dividing the file in response to a tiered-storage decision selecting the assigned tier.

In some examples, method 300 may further include representing the cloud-based volume as a proxy volume in a disk group. In some examples, method 300 may further include tagging the cloud-based volume as a data-only volume.

As illustrated in FIG. 3, at step 308 one or more of the systems described herein may name each stored portion of the files with respective object names including file metadata describing respective characteristics of the respective portions of the files. The systems described herein may perform step 308 in a variety of ways. For example, naming module 110 may, as part of computing device 202 and/or server 206 in FIG. 2, name each stored portion of file 121 with respective object name 129 including file metadata 130 describing respective characteristics 131 of the respective portion of file 121.

In an embodiment, method 300 may further include storing the file metadata on the local storage device. In an example, method 300 may further include storing the respective object names on the local storage device. In some examples, respective object names including file metadata describing respective characteristics of respective portions of the files may be created and stored for objects that are stored on cloud-based storage devices prior to creating the respective object names. In some embodiments, objects that are stored on cloud-based storage devices may be renamed using the techniques described herein.

In some embodiments, method 300 may include providing strict data consistency (e.g., so most recent data is provided on access) by updating a stored portion of the file by writing the updated stored portion of the file in a new object having a new respective object name, where the new respective object name includes file metadata describing respective characteristics of the updated stored portion of the file.

In some embodiments, the file metadata may include at least one of (1) a file path, (2) a file system unique identifier, (3) a file set identifier, (4) an inode number, (5) an inode generation count, (6) a logical offset within the file, (7) size of the portion, (8) a unique number, (9) a flag identifying the respective portion of the file is stored on the cloud-based volume or the local volume, and/or (10) at least one flag identifying a cloud storage class.

In some embodiments, object names may include file metadata that may enable easy access to the files directly from cloud-based storage systems. In some examples, object names may be in the following format, or a variation thereof:

<filepath>_<fsuuid>_<fsetid>_inumber>_<igen>_
<off>_<size>_<unique number>

In some examples, object names may include less than all of the metadata in the name format above and/or metadata in a different order than that in the name format above.

"filepath" generally refers to a path of the entire file from mountpoint including filename. This attribute helps in fetching digital information directly from cloud-based storage systems in case of unavailability of local storage devices.

"fsuuid" generally refers to a file system unique id. There may be multiple file systems mapped to a single bucket so this attribute helps in segregating objects of different file systems.

"fsetid" generally refers to a fileset identifier to segregate clone chains within file systems.

"inumber" generally refers to an inode number. Sometimes, there may be limitations in object name length enforced by cloud storage service providers. In some cases, parent directories names may have to be shortened from file paths. Inode numbers may be used to segregate between files having complete parent directory names and files having shortened parent directory names.

"igen" generally refers to inode generation count. If files are deleted and created again with the same name and assigned the same inode number, this generation count may be used to distinguish between old and new objects.

"Off" generally refers to offsets within files.

"size" generally refers to a size of an object.

"unique number" generally refers to a unique number assigned to a new object. Some cloud storage service providers may provide eventual consistency for digital information writes and delete, which may result in reading of stale data. While updating data, the provided techniques may create a new object with a new unique number to maintain strict consistency. In some examples, the outdated object may be deleted.

In a non-limiting example, an object has the following metadata:
Filename: dir1/cloudfile
FSUUID: 7d6b115bffff0700531f0000ff14ff31
Fset id: 999
Inode number: 4
Inode gen count: 1098245904
Offset: 923123712
Object size: 16384
Unique number: 197011

Thus, a name of the object having this metadata may be:

dir1/cloudfile_7d6bff5bffff0700531f0000ff14ff31_999_4_1098245904_923123712_16384_197011

In some examples, to keep file path, object size, and flags consistent these attributes may be stored as a part of file attributes. In some embodiments, maximum object size may be a per-file property indicating a maximum object length mapped to a file. In an embodiment, flags may be used to distinguish classes of cloud storage provided by different cloud storage service providers, as some cloud storage classes may not permit update or synchronous reads on an object (e.g., a glacier).

In some embodiments, at least a portion of information required to recreate metadata of cloud volumes, and in some examples, all information required to recreate metadata of cloud volumes may be stored in object names. Thus, when local storage devices fail, file systems may be recreated from objects. Furthermore, in some examples, the provided techniques may also enable and/or assist mapping existing objects in local storage devices and cloud-based storage devices to file systems. In an example, method 300 may include reconstructing, such as when file system metadata relating to digital information stored on the cloud-based storage device is unusable, content of a file including the file name by parsing object names of objects stored on the cloud-based storage device.

In some embodiments, method 300 may include providing strict data consistency (e.g., so most recent data is provided on access) by updating a stored portion of the file by writing the updated stored portion of the file in a new object having a new respective object name, where the new respective object name includes file metadata describing respective characteristics of the updated stored portion of the file. In some embodiments, the unique number may be updated and stored as part of metadata, and the unique number may be part of new object name.

Figure 4:
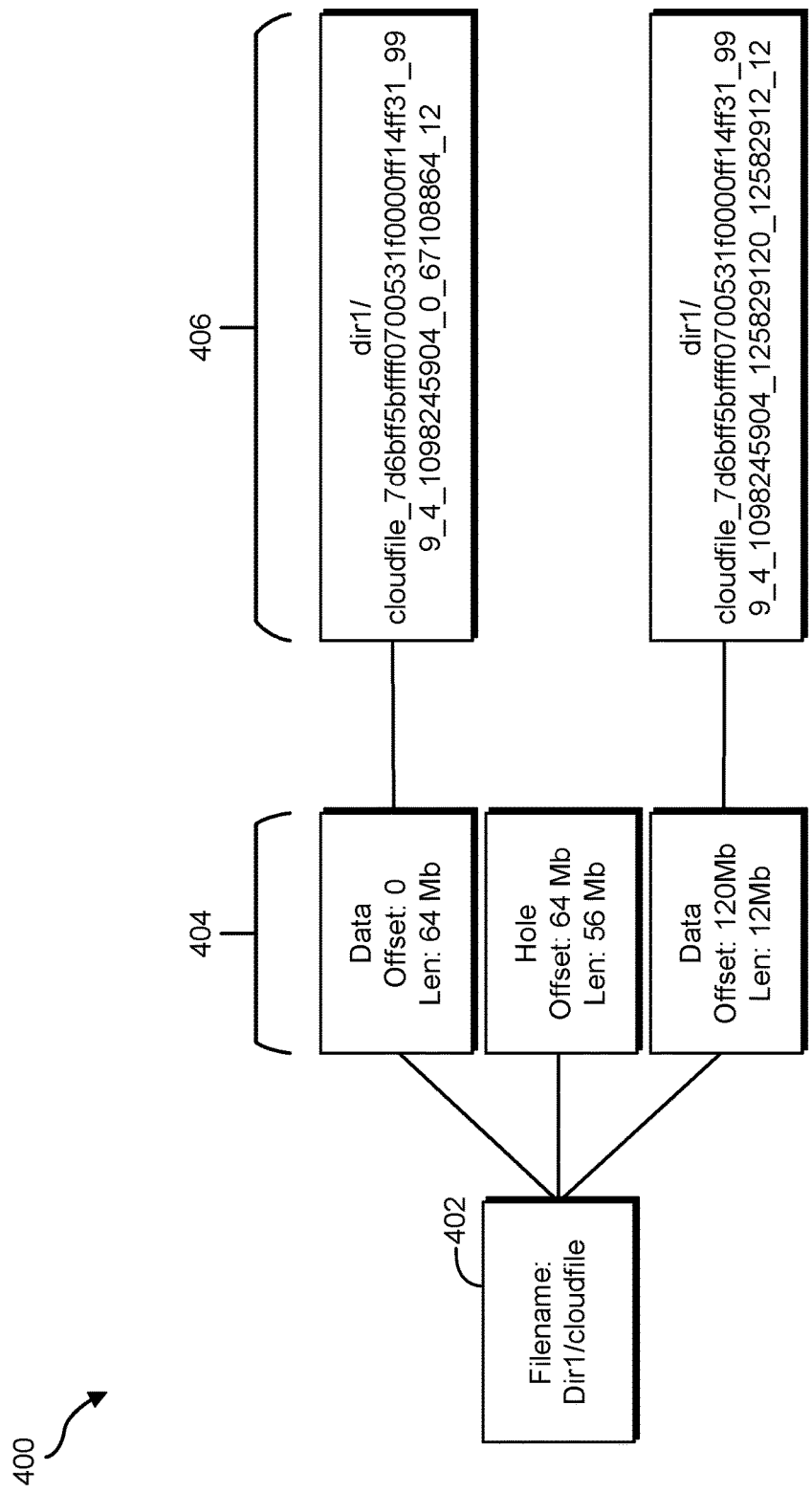
FIG. 4 depicts an example of file-to-object mapping for storing information within hybrid storage with local and cloud-based storage devices.

FIG. 4 depicts a non-limiting example of file-to-object mapping 400 for storing information within hybrid storage with local and cloud-based storage devices. In some examples, file-to-object mapping 400 may include identifying a file name 402 of a file, dividing the file into multiple portions 404 (e.g., extents of various sizes), and creating respective object names 406 for each portion. Object names 406 for each portion object may be stored on a local storage device. Object names 406 may include file metadata describing respective characteristics of the respective portions of the files. Object names 406 may use an object naming format as follows:

<filepath>_<fsuuid>_<fsetid>_<inumber>_<igen>_
        <off>_<size>_<unique number>

As detailed above, the steps outlined in method 300 in FIG. 3 and file-to-object mapping 400 in FIG. 4 may provide systems and methods for storing information within hybrid storage with local and cloud-based storage devices. By doing so, the systems and methods described herein may enable using cloud-based storage devices as tiers to manage storage needs with agility and flexibility. Further, the systems and methods described herein may improve the functionality of computing devices by automatically storing information within hybrid storage systems including both local storage device and cloud-based storage devices, thus enabling (1) cost-effective storage of digital information, (2) releasing expensive DAS devices and SAN devices, and/or (3) addressing other challenges described above.

In some examples, digital information file migration may be performed based on xml policies. When source tiers or target tiers have cloud volumes, an "ioctl (VX_ALLOCPOLICY_CLOUD)" (e.g., issued by "fsppadm") may relocate files to or from cloud volumes as follows:

```
Ioctl(VX_ALLOCPOLICY_CLOUD):
 1. Create a reorg inode and link it to the primary inode
 2. If (cloud attribute) then
 3.     If (target tier is cloud) then
 4.         Set extop VX_MOVE_CLDTOCLD (cloud-based storage
           devices to cloud-based storage devices relocation)
 5.     else
 6.         Set extop VX_MOVE_FROMCLOUD (cloud-based
           storage devices to local storage devices relocation)
 7.     endif
 8. else
 9.     Set extop VX_MOVE_TOCLOUD (local storage devices to
        cloud-based storage devices relocation)
10.     Create cloud attribute.
11. endif
12. offset = 0
13. while (offset < file_size)
14. do
15.     Read data in fixed size chunks from local storage
        devices or cloud-based storage devices according to the relocation.
16.     Write data in fixed size chunks to local storage
        devices or cloud-based storage devices according to the relocation.
17.     Enter the extent map in reorg inode.
18.     offset += fixed size
19. done
20. Swap extent map of reorg and primary inode
21. If (VX_MOVE_FROMCLOUD) then
22.     Delete objects in cloud-based storage devices.
23.     Remove cloud attribute.
24. else if (VX_MOVE_CLDTOCLD)
25.     Delete objects from source tier.
26. endif
27. Clear extop.
28. Unlink reorg and primary and destroy reorg inode.
```

In an embodiment, systems and methods described herein may provide digital information consistency of files (i.e., crash consistency), following system crashes, by (1) identifying information movement in progress during the crash and/or (2) reorganizing information identified as being moved during the crash. In one example, when systems crash during migrations of files, the files will be in an inconsistent state and using "extops" may identify information movement in progress during the crashes.

```
extop_processing( ):
 1. If (extop == VX_MOVE_TOCLOUD) then
 2.     If (cloud attribute) then
 3.         If (Last data extent of reorg is same as last data extent of
            primary)
        then
 4.             If (reorg swap is not done) then
 5.                 Do reorg swap.
 6.             endif
 7.             Free the on-premise data extents of reorg inode.
 8.         else
 9.             Delete the cloud objects of reorg inode.
10.         endif
11.     endif
12. else if (extop == VX_MOVE_FROMCLOUD)
13.     If (cloud attribute) then
14.         If (Last data extent of reorg is same as last data extent of
            primary)
        then
15.             If (reorg swap is not done) then
16.                 Do reorg swap.
17.             endif
18.             Delete the cloud objects of reorg inode.
19.         else
20.             Free the local storage device data extents of reorg
                inode.
21.         endif
22.     endif
23. else if (extop == VX_MOVE_CLDTOCLD)
24.     If (Last data extent of reorg is same as last data extent of
        primary) then
25.         If (reorg swap is not done) then
26.             Do reorg swap.
27.         endif
28.     endif
```

```
29.     Delete the cloud objects of reorg inode.
30.     endif
31.     Clear extop.
```

In an example, digital information may be read and/or written to a cloud-based storage device (e.g., using object name formats as described herein). In some embodiments, the following instructions may create new object names for objects as follows:

```
Read(file, offset, length):
  1.    While(length) do
  2.        Find extent for the requested offset
  3.        If (is cloud extent) then
  4.            Read attribute
  5.            Create object name using inode, attribute, and extent
details as mentioned herein.
  6.            Issue GET request on object.
  7.        endif
  8.        Decrement length by extent size.
  9.        Increment offset by extent size.
  10.   done
```

In an embodiment, digital information stored in cloud-based storage devices may be deleted using a "remove" command:

```
Remove (inode):
  1.    Delete file's directory entry.
  2.    Mark extop IEREMOVE on inode to remove it in delayed manner.
  3.    As part of delayed processing of IEREMOVE,
  4.        If (is cloud file) then
  5.            Read attribute.
  6.            off = 0;
  7.            while (EOF) do
  8.                Find extend for offset off.
  9.                Create object name using inode, attribute, and extent
details.
  10.               Issue Delete request on object.
  11.               Increment off by extent size.
  12.           done
  13.           Remove cloud attribute.
  14.       endif
  15.   Mark the inode free.
```

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access digital information and/or configuration information of another customer.

According to various embodiments, all or a portion of example system 100 in FIG. 1 may be implemented within a virtual environment. For example, the modules and/or digital information described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for storing information within hybrid storage with local and cloud-based storage devices, at least a portion of the method being performed by a computing device comprising at least one processor, the method comprising:
   dividing, at the computing device, a file into multiple portions;
   storing a first portion of the multiple portions as at least one first respective separate object on a local volume stored on the local storage device without storing the at least one first respective separate object on a cloud-based storage device;
   storing a second portion of the multiple portions as at least one second respective separate object on a cloud-based volume stored on the cloud-based storage device; and
   naming each stored portion of the file with a respective object name comprising file metadata describing respective characteristics of the respective portion of the file, including at least one flag identifying a cloud storage class.

2. The computer-implemented method of claim 1, further comprising creating at least one volume set, wherein the at least one volume set comprises:
   the local volume stored on the local storage device; and
   the cloud-based volume stored on the cloud-based storage device.

3. The computer-implemented method of claim 2, further comprising creating a multi-volume file system comprising the at least one volume set.

4. The computer-implemented method of claim 1, further comprising tagging the cloud-based volume as a data-only volume.

5. The computer-implemented method of claim 1, further comprising representing the cloud-based volume as a proxy volume in a disk group.

6. The computer-implemented method of claim 1, further comprising:
   assigning a tier to the cloud-based volume and the local volume; and
   dividing the file in response to a tiered-storage decision selecting the assigned tier.

7. The computer-implemented method of claim 1, wherein the file metadata comprises:
   a file path;
   a file system unique identifier;
   a file set identifier;
   an inode number;
   an inode generation count;
   an offset within the file; and
   a size of the respective portion.

8. The computer-implemented method of claim 1, further comprising storing the file metadata on the local storage device.

9. The computer-implemented method of claim 1, further comprising storing the respective object names on the local storage device.

10. The computer-implemented method of claim 1, further comprising ensuring, following a system crash, digital information consistency of the file by:
    identifying information movement in progress during the crash; and
    reorganizing information identified as being moved during the crash.

11. The computer-implemented method of claim 1, further comprising updating a stored portion of the file by writing the updated stored portion of the file in a new object having a new respective object name, wherein the new respective object name comprises file metadata describing respective characteristics of the updated stored portion of the file, including a unique number which is modified whenever the stored portion of the file is updated.

12. The computer-implemented method of claim 1, further comprising reconstructing, when file system metadata relating to digital information stored on the cloud-based storage device is unusable, contents of the file including the file name by parsing object names stored on the cloud-based storage device.

13. The computer-implemented method of claim 1, wherein the file metadata comprises a unique number.

14. The computer-implemented method of claim 1, wherein the file metadata comprises a flag identifying the respective portion of the file is stored on the cloud-based volume.

15. The computer-implemented method of claim 1, wherein the file metadata comprises a flag identifying the respective portion of the file is stored on the local volume.

16. The computer-implemented method of claim 1, wherein the cloud storage class does not permit an update read on the at least one second respective separate object.

17. A system for storing information within hybrid storage with local and cloud-based storage devices, the system comprising:
    a dividing module, stored in memory, that divides a file into multiple portions;
    a first storing module, stored in the memory, that stores a first portion of the multiple portions as at least one first respective separate object on a local volume stored on the local storage device without storing the at least one first respective separate object on a cloud-based storage device;
    a second storing module, stored in the memory, that stores a second portion of the multiple portions as at least one second respective separate object on the cloud-based volume stored on the cloud-based storage device;
    a naming module, stored in the memory, that names each stored portion of the file with a respective object name comprising file metadata describing respective characteristics of the respective portion of the file, including at least one flag identifying a cloud storage class; and at least one physical processor that executes the dividing module, the first storing module, the second storing module, and the naming module.

18. The system of claim 17, further comprising a creating module, stored in the memory, that creates at least one volume set, wherein the at least one volume set comprises:
the local volume stored on the local storage device; and
the cloud-based volume stored on the cloud-based storage device.

19. The system of claim 17, further comprising:
an assigning module, stored in the memory, that assigns a tier to the cloud-based volume and the local volume; and
a dividing module, stored in the memory, that divides the file in response to a tiered-storage decision selecting the assigned tier.

20. The system of claim 17, wherein the file metadata comprises:
a file path;
a file system unique identifier;
a file set identifier;
an inode number;
an inode generation count;
an offset within the file;
a size of the portion;
a unique number;
a flag identifying the respective portion of the file is stored on the cloud-based volume or the local volume; and
at least one flag identifying a cloud storage class.

21. A non-transitory computer-readable medium comprising one or more computer-executable instructions that, when executed by at least one processor of a computing device, cause the computing device to:
divide, at the computing device, a file into multiple portions;
store a first portion of the multiple portions as at least one first respective separate object on a local volume stored on a local storage device without storing the at least one first respective separate object on a cloud-based storage device;
store a second portion of the multiple portions as at least one second respective separate object on a cloud-based volume stored on the cloud-based storage device; and
name each stored portion of the file with a respective object name comprising file metadata describing respective characteristics of the respective portion of the file, including at least one flag identifying a cloud storage class.

22. The non-transitory computer-readable medium of claim 21, further comprising one or more computer-executable instructions that, when executed by at least one processor of a computing device, cause the computing device to create at least one volume set, wherein the at least one volume set comprises:
the local volume stored on the local storage device; and
the cloud-based volume stored on the cloud-based storage device.

23. The non-transitory computer-readable medium of claim 21, further comprising one or more computer-executable instructions that, when executed by at least one processor of a computing device, cause the computing device to:
assign a tier to the cloud-based volume and the local volume; and
divide the file in response to a tiered-storage decision selecting the assigned tier.

24. The non-transitory computer-readable medium of claim 21, wherein the file metadata comprises:
a file path;
a file system unique identifier;
a file set identifier;
an inode number;
an inode generation count;
an offset within the file;
a size of the respective portion;
a unique number;
a flag identifying the respective portion of the file is stored on the cloud-based volume or the local volume; and
at least one flag identifying a cloud storage class.

* * * * *